(12) United States Patent
Shin

(10) Patent No.: US 10,635,753 B2
(45) Date of Patent: Apr. 28, 2020

(54) NEURAL MACHINE TRANSLATION METHOD AND APPARATUS

(71) Applicant: Electronics and Telecommunications Research Institute, Daejeon (KR)

(72) Inventor: Jong Hun Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 93 days.

(21) Appl. No.: 15/944,939

(22) Filed: Apr. 4, 2018

(65) Prior Publication Data

US 2019/0129947 A1 May 2, 2019

(30) Foreign Application Priority Data

Oct. 26, 2017 (KR) .......................... 10-2017-0140232

(51) Int. Cl.
    *G06F 17/28* (2006.01)
    *G10L 25/30* (2013.01)
    (Continued)

(52) U.S. Cl.
    CPC .......... *G06F 17/289* (2013.01); *G06F 17/277* (2013.01); *G06F 17/2827* (2013.01);
    (Continued)

(58) Field of Classification Search
    None
    See application file for complete search history.

(56) References Cited

U.S. PATENT DOCUMENTS

| 2012/0150529 A1 | 6/2012 | Kim et al. |
| 2013/0132064 A1 | 5/2013 | Hwang et al. |

(Continued)

FOREIGN PATENT DOCUMENTS

| KR | 10-2008-0052282 | 6/2008 |
| KR | 10-2012-0018687 | 3/2012 |
| KR | 10-2017-0057792 | 5/2017 |

OTHER PUBLICATIONS

Minh-Thang Luong et al.; "Addressing the Rare Word Problem in Neural Machine Translation"; arXiv: 1410.8206v4 [cs.CL] May 30, 2015.

(Continued)

*Primary Examiner* — Antim G Shah
(74) *Attorney, Agent, or Firm* — Kile Park Reed & Houtteman PLLC

(57) ABSTRACT

The present invention provides a method of generating training data to which explicit word-alignment information is added without impairing sub-word tokens, and a neural machine translation method and apparatus including the method. The method of generating training data includes the steps of: (1) separating basic word boundaries through morphological analysis or named entity recognition of a sentence of a bilingual corpus used for learning; (2) extracting explicit word-alignment information from the sentence of the bilingual corpus used for learning; (3) further dividing the word boundaries separated in step (1) into sub-word tokens; (4) generating new source language training data by using an output from the step (1) and an output from the step (3); and (5) generating new target language training data by using the explicit word-alignment information generated in the step (2) and the target language outputs from the steps (1) and (3).

2 Claims, 2 Drawing Sheets

(51) Int. Cl.
*G06N 3/04* (2006.01)
*G06N 3/08* (2006.01)
*G06F 17/27* (2006.01)

(52) U.S. Cl.
CPC ......... *G06N 3/0445* (2013.01); *G06N 3/0454* (2013.01); *G06N 3/08* (2013.01); *G10L 25/30* (2013.01)

(56) References Cited

U.S. PATENT DOCUMENTS

2013/0204606 A1* 8/2013 Zong ................ G06F 17/277
  704/8
2017/0139905 A1  5/2017 Na

OTHER PUBLICATIONS

Rico Sennrich et al.; "Neural Machine Translation of Rare Words with Subword Units"; ACL 2016; arXiv: 1508.07909v5 [cs.CL] Jun. 10, 2016.
Dzmitry Bahdanau et al.; "Neural Machine Translation by Jointly Learning to Align and Translate"; ICLR 2015; arXiv:1409.0473v7 [cs.CL] May 19, 2016.

* cited by examiner

NEURAL MACHINE TRANSLATION METHOD AND APPARATUS

CROSS-REFERENCE TO RELATED APPLICATION

This application claims priority to and the benefit of Korean Patent Application No. 2017-140232, filed on Oct. 26, 2017, the disclosure of which is incorporated herein by reference in its entirety.

BACKGROUND

1. Field of the Invention

The present invention relates to neural machine translation (NMT) using a neural network and a recurrent neural network with long short-term memory (RNN-LSTM). More specifically, the present invention relates to an end-to-end NMT method and apparatus based on a sub-word token to which explicit word-alignment information is added.

2. Discussion of Related Art

One of various types of neural machine translation (NMT) is based on an encoder-decoder mechanism. The encoder-decoder mechanism-based NMT refers to an artificial neural network learning and prediction mechanism which uses a recurrent neural network with long short-term memory (RNN-LSTM) or a convolutional neural network (CNN) to compress (or abstract) an input sentence of source language into a single or multiple N-dimensional vectors by using an encoder and to generate an output sentence (a translation result) of target language from the compressed (abstracted) representations by using a decoder. Many researches have been conducted on a neural network structure and learning method for implementing this mechanism, and the mechanism is now known as a core technology of services provided by companies, such as Google Co., Naver Corp. (from Korea), etc.

In such a type of machine translation, when a word that does not appear frequently or a word that has never appeared in a collection of sentence pairs (a bilingual corpus) is given, the word is collectively considered as a reserved unregistered word token and is replaced with a single embedding vector for the unregistered word. In other words, if the embedding vector is regarded as a type of dictionary, a predefined specific embedding vector is returned each time a word token that does not exist in the dictionary appears. This event generally occurs in the encoder which abstracts the source sentence. It also occurs in the decoder which generates a target sentence, when the decoder outputs an unregistered word token to generate a word sequence which has not been learned.

In the natural language used by humans, new words may be created and disappear over time or due to regional differences or the like; or a single word may be used to represent various meanings. Meanwhile, in the above-described neural machine translation, there may be a limited number of unique word tokens existing in a bilingual corpus used in a learning step.

On the other hand, statistics-based machine translation and artificial neural network machine translation utilize a deep-learning approach. Once a person collects and processes training data and gives the data to a computer, the computer learns by itself based on the received training data. At the end of learning, a translator has an ability to translate new sentences based on what it has learned.

SUMMARY OF THE INVENTION

The present invention aims to solve the problems of the conventional neural machine translation (NMT) system and to improve a translation performance of a system that is trained with a small number of bilingual corpus.

Therefore, it is one objective of the present invention to provide a method of generating, without imparing sub-word tokens, training data to which explicit word-alignment information is added, and an NMT method including the same.

It is another objective of the present invention to provide an NMT apparatus with an improved structure which performs learning and translation using the generated training data.

According to one general aspect of the present invention, there is provided a method of generating training data for NMT which includes a source sentence and a translated sentence of the source sentence. The method includes the steps of: (1) separating basic word boundaries through morphological analysis or named entity recognition of a sentence of a bilingual corpus used for learning; (2) extracting explicit word-alignment information from the sentence of the bilingual corpus used for learning; (3) further dividing the word boundaries separated in step (1) into sub-word tokens; (4) generating new source language training data by using an output from the step (1) and an output from the step (3); and (5) generating new target language training data by using the explicit word-alignment information generated in the step (2) and the target language outputs from the steps (1) and (3).

According to another general aspect of the present invention, there is provided an NMT method using a neural network which, when training data generated by the method of generating the training data is input, is trained with the training data, and generates a connection relationship between a source sentence input to the trained neural network and a target sentence output from the trained neural network.

According to still another general aspect of the present invention, there is provided an NMT apparatus using a neural network, including: a training data processor configured to generate training data by using the method of generating training data; and a model generator configured to train a neural network with the training data generated by the training data processor and generate an automatic translation model used to generate a connection relationship between a target sentence and a source sentence.

The neural network trained with the training data in the model generator may be implemented based on a recurrent neural network with long short-term memory (RNN-LSTM) architecture.

The above configuration and operations of the present invention will become more apparent from exemplary embodiments described below with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
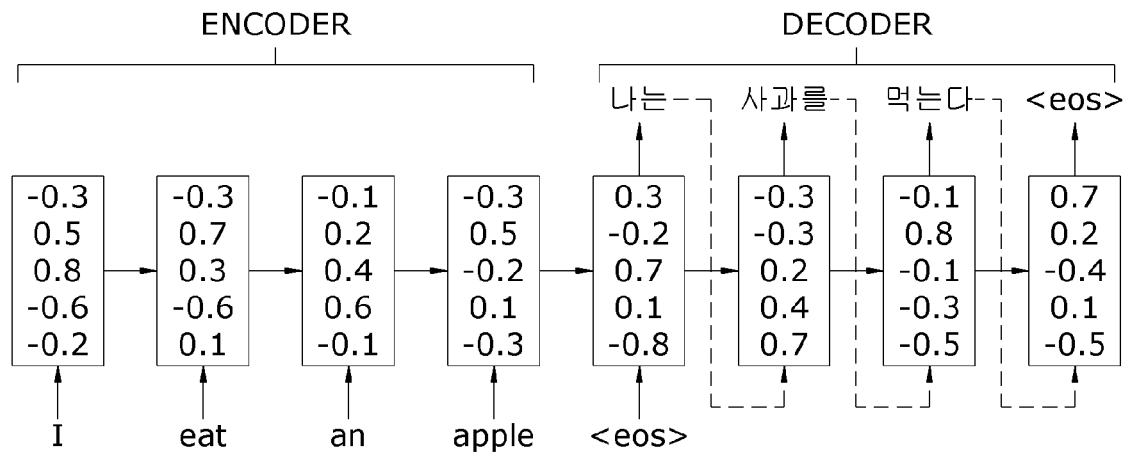
FIG. 1 is a conceptual diagram of a neural machine translation system based on an encoder-decoder mechanism.

A brief description of characteristics of a neural machine translation (NMT) system on the basis of an encoder-decoder mechanism will be given before describing the specific content of the present invention. Referring to FIG. 1, the NMT system generates a single N-dimensional vector compressed, through an encoder, from a source input sentence, and then recursively predicts the next word, through a decoder, based on the output of the encoder and currently generated target word information.

The encoder compresses/abstracts contextual elements of the input source language, which means the encoder generates a series of sentence vectors that contain semantic and syntactic characteristics of the source language. In addition, the decoder predicts the next word on the basis of a current status and previously predicted words. It acts as a kind of language model that generates an arbitrary sentence consisting of target words. That is, the decoder is given abstractive information of the source language, which is represented as the output of the encoder, as a conditional variable, and predicts the target words based on a target language translation method trained by the decoder. The prediction of the decoder is repeatedly performed until an end-of-sentence reserved word, which indicates the completion of a target sentence, appears, and, from among candidate sentences generated during the process, a target sentence considered to be most natural is selectively output.

Due to the nature of the procedures of this mechanism, it is not known whether word tokens constituting a target sentence are generated from word tokens within an input sentence, and thus there is characteristically no explicit, direct correlation between words constituting a source sentence which has been input and words constituting a generated target sentence.

In order to configure an NMT system having the above characteristics, there are provided: a neural network learning step in which a collection of pairs of a sentence of source language and a sentence of target language (i.e., bilingual corpus) is received and learned; and a prediction step in which machine translation is performed on the basis of a neural network model generated in the learning step.

For the neural network learning, source words are divided into pieces by a specific criterion, and each of the pieces is transformed into a one-dimensional vector and is represented as a two-dimensional embedding vector. During this process, the word tokens constituting source words and the target sentence used in the learning step are fixed. For example, when there are 1,000 unique words constituting a corpus of source language used for learning wherein each word being expressed as a one-dimensional vector represented by 500 floating points, the source words are transformed into 1,000×500 two-dimensional vectors. These two-dimensional vectors are embedding vectors. In another example, when there are 500 unique word tokens constituting a corpus of target language and each word is expressed as a one-dimensional vector of the same length as that of the one-dimensional vector of the source language, the unique word tokens are also transformed into 500×500 two-dimensional vectors. In the neural network learning, the input source words and the target words are transformed into embedding vectors that match the respective unique word tokens and the embedding vectors are processed as input information.

Typically, two approaches to the neural network learning have been studied. According to Approach 1, a pre-processing process in which rare words, such as proper nouns or numbers, are directly replaced by specific words of reserved language in advance is performed, such that words that are not represented in a learning step can be replaced. Then the output is learned. Thereafter, when an unknown word is input in a prediction step, the word is replaced by a word of the same reserved language and then is transmitted to an input of an encoder. Then, when the reserved language appears in a target sentence generated by a decoder, a post-processing step in which the word of the reserved language is copied from a source sentence or replaced with reference to a dictionary is performed. (Luong et al, "*Addressing the Rare Word Problem in Neural Machine Translation*", eprint arXiv: 1410.8206, 2014)

In another Approach 2, each word is split into sub-words having shorter lengths than those of normal words used by humans, and the split sub-words are output as a target sentence and are combined to form an original word form through post-processing. (Sennrich et al, "*Neural Machine Translation of Rare Words with Subword Units*", in *Proceedings of ACL'16*, 2016)

Approach 1 has disadvantages in that a boundary of a word token to be replaced is normalized through a morphological analysis or a named entity recognition (NER) technology and a word alignment process is required to estimate a relationship between the word token in the source sentence and a word in a target sentence in an effort to figure out which word replaces the word token. Hence, the performances of detailed elementary technologies required for the processes are directly reflected to an NMT. That is, if the results of the aforementioned detailed element technologies are poor, the performance of the NMT trained with the results is also degraded.

Meanwhile, in Approach 2, sequences of finely split sub-word tokens are learned intact without the word alignment process used in Approach 1. Since a separate word alignment process is not necessary and detailed elementary technologies are not used, there are no problems as in Approach 1. Approach 2, when used in NMT, finely splits a word that does not even exist in a training corpus so that sub-words are reflected as much as possible, and thus Approach 2 may be considered as a method supportable for an open vocabulary. Approach 2 has a higher performance as the amount of bilingual corpus used for learning increases, and thus it has been universally used in the recent commercialized neural network machine translation system. A relatively high translation quality compared to that of Approach 1 is expected. However, when a bilingual corpus necessary for training has a small number of words, the degree of learning of sequences of sub-words is low, thus an inaccurate translation may frequently occur even when using Approach 2, which results in a low-quality translation result for unregistered words.

In order to improve the performance of an encoder-decoder mechanism-based neural network machine translation model, an attention model (refer to Bandanau et al, "*Neural Machine Translation by Jointly Learning to Align and Translate*", in *Proceedings of ICLR'15*, 2015) that indirectly learns a correlation between word tokens used in a source sentence input and a target word token appearing in a generated target sentence in a neural network learning step is recently widely being used, but is still far from explicit word-alignment information or hard alignment information of individual word tokens and target word tokens. In the attention model, implicit word-alignment information or soft alignment information is used to represent such a feature. That is, there is a limitation in that attention information used for a specific target word may not be aligned one-to-one with a designated word token in a source sentence.

The above-described Approaches 1 and 2 may be used in combination, but the following problems exist in applying Approach 1 and Approach 2, so that the above-described Approaches 1 and 2 cannot be appropriately combined.

First, due to Approach 1 that performs direct replacement of word, the number of sub-words to be applied for Approach 2 is relatively reduced. In other words, when replacing a large number of unregistered words by using Approach 1, Approach 2 cannot be effectively applied to because the number of sequences of sub-word tokens is reduced and thus the sub-word tokens may not be correctly learned in the learning step.

Second, when a word is finely split into sub-word tokens as in Approach 2, complexity increases in a pre-processing process required for Approach 1, especially in a process of acquiring explicit word-alignment information. Accordingly, a possibility that the word-alignment information itself is correctly processed becomes far lower, and in turn data containing incorrect word-alignment information is learned. Thus there arises a problem that the quality of an NMT system is rather degraded.

In the present invention, an NMT system capable of correcting a mistranslated unregistered word through a configuration in which Approach 1 and Approach 2 are combined is implemented while resolving the above problems.

Hereinafter, a method of generating training data to which explicit word-alignment information is added, which is one of objectives of the present invention, will be described with reference to FIG. 2.

In operation 100, basic word boundaries are separated through morphological analysis or NER of sentences of source language and target language of a bilingual corpus used for learning. This operation may be performed for one or both of the source language and the target language.

In operation 200, explicit word-alignment information is extracted.

In operation 300, the word boundaries separated in operation 100 are further divided into sub-word tokens. This operation may be performed for one or both of the source language and the target language.

In operation 400, new source language training data is generated using an output from processing the source language in operation 100 and an output from processing the source language in operation 300. Unlike in Approach 1, the word-alignment information extracted in operation 100 is inserted into each of the sub-word tokens divided in operation 300 as additional information and then is represented, without directly replacing the sub-word tokens constituting the input sentence of source language.

In operation 500, new target language training data is generated using the explicit word-alignment information generated in operation 200 and an output obtained by processing, in operations 100 and 300, the target language. Unlike in Approach 1, the explicit word-alignment information extracted in operation 200 and source word order information, which is processed and generated in operation 100 and attached to the sentence of source language, are combined with each other and the modified alignment information is inserted into each of the sub-word tokens generated in operation 300 and then is represented, without directly replacing the sub-word tokens constituting the sentence of target language.

Figure 2:
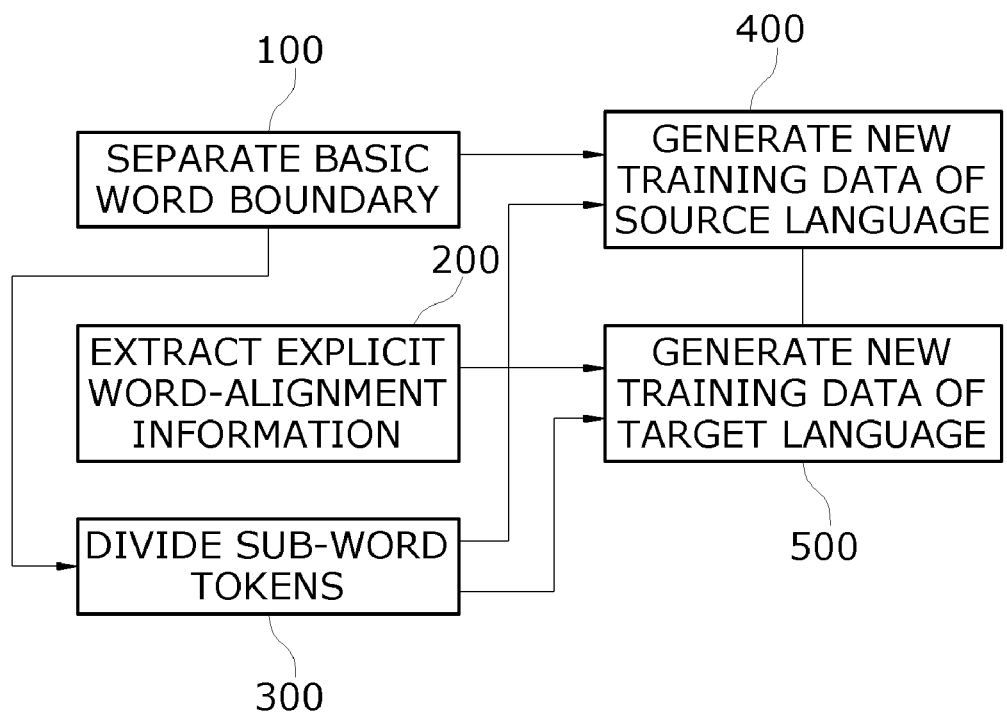
FIG. 2 is a flowchart illustrating a method of generating training data to which explicit word-alignment information is added according to the present invention.

Operations 100 and 200 in the process flow of FIG. 2 may be performed using the above-described Approach 1, and operation 300 may be performed using Approach 2.

Each of the operations in FIG. 2 will be described below in more detail.

Among bilingual corpora used for machine learning, sentences as shown below are given as one Korean (source language) and English (target language) sentence pair:

[Korean] 그리고 우리는 미동 마을에 있는 이쁜이 게스트 하우스 를 예약했다.
[English] And we booked a room at IPUNY Guest House in Midong village.

Below is a table showing Korean words and phonetic representations thereof corresponding to each of English words in the above-described example training data.

| English Word | Korean Word | Phonetic Representation |
| --- | --- | --- |
| And | 그리고 | [gu-ri-go] |
| we | 우리는 | [u-ri-nun] |
| booked | 예약했다 | [ye-yak-hæt-da] |
| a | — | |
| room | — | |
| at | — | |
| IPUNY | 이쁜이 | [ib-pu-ni] |
| Guest | 게스트 | [gest] |
| House | 하우스를 | [haus-rul] |
| in | 에 있는 | [e-in-nun] |
| Midong | 미동 | [mi-dong] |
| village | 마을 | [ma-ul] |

For reference, in the above table there may be no Korean word that is exactly phraseologically or grammatically equivalent to the English word. Unlike English, Korean language does not have articles; and it has a word class (postpositions or suffixes in Korean) similar to prepositions in English, which is not independent and must be attached to specific words. It is thus noted that separation of Korean words and separation of English words cannot be accurately represented in the above table.

In operation 100 of FIG. 2, word sections are determined through morphological analysis and NER for the source language and the target language, content words and functional words are separated, and boundaries of content words are determined. The boundaries of content words are determined as shown below.

[Korean] '그리고'(1) '우리'(2) '는'(3) '미동'(4) '마을'(5) '에'(6) '있는'(7) '이쁜이 게스트'(8) '하우스'(9) '를'(10) '예약했다'(11) ·(12)
[English] 'And'(1) 'we'(2) 'booked'(3) 'a'(4) 'room'(5) 'at'(6) 'IPUNY'(7) 'Guest House'(8) 'in'(9) 'Midong'(10) 'village'(11) '.'(12)

Numbers after each word are assigned in order of the words. The numbers are provided for convenience of description, and in reality each word token is separated as shown by a slash below.

[Korean] 그리고/우리/는/미 동/마을/에/있는/이 쁜이 게스트/하우스/를/예약했다/.
[English] And/we/booked/a/room/at/IPUNY/Guest House/in/Midong/village/.

In operation 200, the explicit word-alignment information is extracted. We extracted the word-alignment information by using a grow-diag-final-and heuristic algorithm (Koehn '03) along with IBM Model 4 (GIZA++). The result is as shown in the following example.

[word-alignment information] 1-1(그리고-And) 2-2(우리-We) 4-10(마동-Midong) 6-6(에-at) 7-9(있는-m) 8-7(이분이 게스트-IPUNY) 8-8(이분이 게스트-Guest House) 9-8(하우스-Guest House) 10-5(를-room) 11-3(예약했다-booked) 11-5(예약했다-room) 12-12(.-.)

Here, in the case of 8-7, 8-8, and 9-8, due to a limitation of a statistical method, word boundaries of the source language and word boundaries of the target language are erroneously divided and hence duplicated connections between them occur. In Approach 1, only cases where the source words and the target words are connected by a 1:1 relationship or a 1:N relationship are allowed, whereas in the present invention, an N:1 relationship and an N:N relationship are additionally allowed, which will be described in operation 500 by taking a processing method thereof as an example.

In operation 300, the output of operation 100 is split into sub-words as shown below. In order to revert back to an original form, a designated reserved symbol (e.g., "+") is attached to the front of each of the split sub-words.

[Korean] 그리고/우리/는/마 +동/마+을/에/있+는/이분+이 + 게스/+트/하우+스/를/예약+ 했/+다.

[English] And/we/book/+ed/a/room/at/I/+P/+U/+N/+Y/Gu/+est/+Ho/+use/in/Mi/+do/+ng/vill/+age/.

The output of operation 300 is basically a completed form of word tokens used in a learning step.

In operation 400, a final input form (training data) of the source language is completed through the output of operation 100 and the output of operation 300.

[Output of operation 100, i.e., input of operation 400]

'그리고'(1) '우리'(2) '는'(3) '마동'(4) '마을'(5) '에'(6) '있는'(7) '이분이 게스트'(8) '하우스'(9) '를'(10) '예약했다'(11) '.'(12)

[Output of operation 300, i.e., input of operation 400]

그리고/우리/는/마+동/마+을/에/있+는/이분+이 + 게스/+트/ 하우+스/를/예 약+ 했/+다.

[Output of operation 400: final training data of source sentence]

그리고^1_B/우리^2_B/는^3_B/마^4_B/+동^4_E/ /마^5_B/+을^5_E/에^6_B/있^7_B/+는^7_E/이분^8_B/ +이^8_M/게스^8_M/+트^8_E/하우^9_B/+스^9_E/ 를^10_B/예약^11_B/+했^11_M/+다^11_E/.^12_B

In the above example, "^" is a separator for attaching an actual order of a word boundary, which is a kind of feature, in the source sentence to a corresponding sub-word segment. It does not need to be modified by directly attaching to a word, and training data may be separately constructed by generating a feature value sequence having the same length as an order token of the source sentence. The key is to configure original word boundary information extracted in operation 100 with the feature value sequence having the same length as the sub-word sequence of the source sentence. Letters "B," "M," and "E" after the numbers are examples of reserved language which, respectively, indicate "begin", "middle", and "end", and other forms may be used (for example, "begin", "intermediary", etc.).

In operation 500, the sub-word sequence of the target language extracted in operation 300 and the explicit word-alignment information extracted in operation 200 are combined with each other. An example of an output of operation 500 is as shown below:

[Output of operation 200, i.e., input of operation 500]

1-1(그리고-And) 2-2(우리-We) 4-10(마동-Midong) 5-11(마을-village) 6-6(에-at) 7-9(있는-in) 8-7(이분이 게스트 IPUNY) 8-8(이분이 게스트 Guest House) 9-8(하우스-Guest House) 10-5(를-room) 11-3(예약했다 booked) 11-5(예약했다 room) 12-12(.-.)

[Target language output of operation 300, i.e., input of operation 500]

And/we/book/+ed/a/room/at/I/+P/+U/+N/+Y/Gu/+est/+Ho/+use/in/Mi/+do/+ng/vill/+age/.

[Output of operation 500 by combining outputs of operation 200 and operation 300: final training data of target sentence]

And^1_B/we^2_B/book^11_B/+ed^11_E/a^NONE_B/ room^NONE_B/at^6_B/I^8,9_B/+P^8,9_M/+U^8,9_M/+ N^8,9_M/+Y^8,9_M/+Gu^8,9_M/+est^8,9_M/+_Ho^8, 9_M/+use^8,9_E/in^7_B/Mi^4_B/+do^4_M/+ng^4_E/ vill^5_B/+age^5_E/.^11_B If alignment information was not present in operation 200, reserved language "NONE", as shown above, is used to indicate that there is no connection information for example, e.g., a^NONE_B). In addition, when connection information exists but is not consecutive, the connection information is removed from the subsequent separate element, as shown in "book^11_B", "+ed^11_E", and "room^NONE_B". Here, "book, +ed" is a third word and "room" is a fifth word in the target language. In addition, when the connection is duplicated and consecutive, a successive order sequence of the source sentence is represented identically (N:N connection. See above 8-7, 8-8, and 9-8). In addition, in the above example, a comma (,) is used as a separation symbol for an order sequence. Similarly to operation 400, unlike in Approach 1, a sub-word sequence of the target language does not need to be replaced. Instead, a feature value having the same length as the target sub-word sequence may be prepared.

Figure 3:
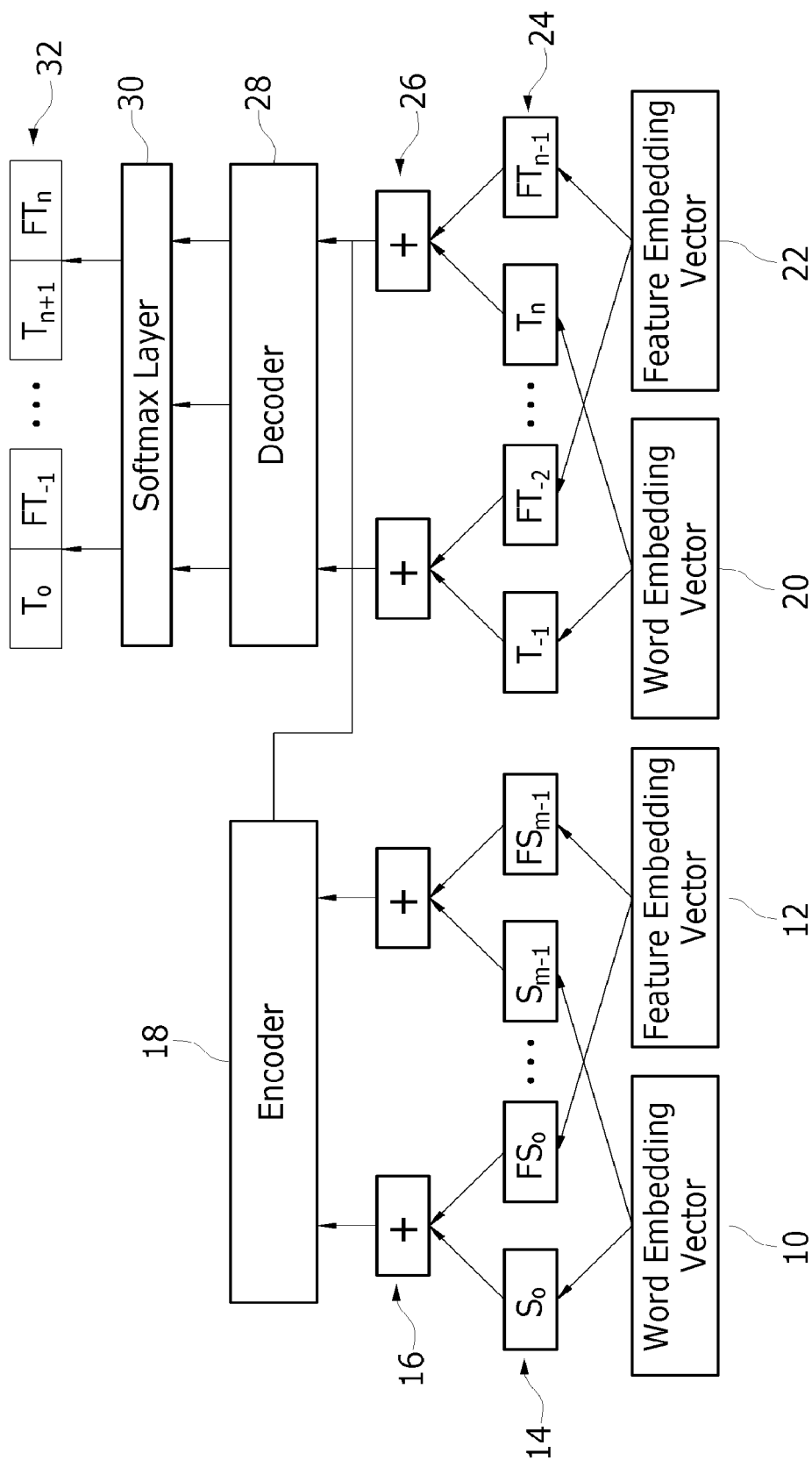
FIG. 3 is a diagram illustrating a configuration of a neural network which learns the training data generated in FIG. 2.

An apparatus for learning training data prepared using the above-described method will be described with reference to FIG. 3. The apparatus may be implemented as a neural network. FIG. 3 is a neural network structure implemented based on a conventional recurrent neural network with long short-term memory (RNN-LSTM) architecture, which shows the following characteristics differently from those of the related art.

(1) N-dimensional embedding vectors 10 and 20 for performing a replacement of feature embedding vectors for adding a feature that matches the order of each of word sequences, along with a replacement of word embedding vectors of a source-side word sequence and a target-side word sequence used for learning.

In the outputs generated from operation 400 and operation 500 through the process described above with reference to FIG. 2, the sub-word tokens constituting the source-side and target-side word sequences are assigned to the word embedding vectors 10 and 20 shown in FIG. 3 and are replaced one-to-one with vectors for neural network learning, thereby becoming elements constituting $S_0$ to $S_{m-1}$ in layer 14 and $T_{-1}$ to $T_n$ in layer 24. Meanwhile, a vector replacement of the explicit word-alignment information attached in operations 400 and 500 is performed through feature embedding vectors 12 and 22, so that the explicit word-alignment information is replaced with alignment information FS and explicit alignment-feature information FT that constitute the layer 14 and the layer 24, respectively.

(2) Feature combining layers 16 and 26 in which the replaced feature embedding vectors and the word embedding vectors of an input word at corresponding positions are combined Each of the vectors corresponding to the layer 14 in FIG. 3 is combined in the feature combining layer 16 according to the order (time-series) of word tokens to meet input requirements of an encoder 18. The combining method may be a simple concatenation that generates a long-length vector by simply combining a sub-word (S in the layer 14) indicating a sub-word token and the alignment information (FS in the layer 14) associated with the sub-word, which are the same point in a time series, but the combination may be calculated as the sum or average of two vectors. In order to enter as an input of a decoder 28, the vectors in the layer 24 are combined through the feature combining layer 26 that performs the same actions as in the method of the feature combining layer 16 and then the combined output is transmitted to the decoder 28. However, in the decoder 28, the alignment information is not inserted into a word of a target sentence given in the learning step, but a feature of a preceding word is combined to a word of the subsequent target sentence.

(3) The decoder 28 learns a combination of the immediately preceding word, a current word, and an immediately preceding feature, and additionally generates explicit alignment-feature vectors ($FT_{-1}$ to $FT_n$ in the layer 32) indicating a word immediately preceding a word sequence ($T_0$ to $T_{n+1}$ in the layer 32 of FIG. 3) predicted in the learning step, unlike in the related art. When a prediction is completed before the final output, because the word $T_{+1}$ in the layer 32 is replaced with a symbol indicating the end of a sentence, the explicit alignment-feature vector $FT_{-1}$ constituting the layer 32 is removed and the explicit alignment-feature vectors $FT_0$ to $FT_n$ are returned along with the words $T_0$ to $T_n$ of the layer 32.

Except the above-described structural characteristics, the present invention is similar to a general neural network structure. That is, the encoder 18 accumulates data received from the feature combining layer 16 thereunder and generates compressed information of source input data 400 for neural network learning. The output from the encoder 18 is transmitted to the decoder 28 along with the target-side input 26, a prediction result that matches the source sentence input is sequentially, repeatedly calculated, so that a piece of compressed information for constructing the layer 32 one at a time is generated in each step. A softmax layer 30 receives the compressed information generated by the decoder 28 and constructs the layer 32 by transforming the information into a vector sequence replaceable with a target word token with the highest probability and alignment information of a word immediately preceding to the target word token.

In order to improve the performance of the above configuration, the configuration may basically utilize the above-described elements, and an additional neural network layer may be added thereto. An example of this additional neural network layer is an attention layer. Modifications of the configuration by adding layers in the neural network will be allowed without detracting from the technical scope of the present invention.

Hereinafter, a correction method for providing an improved result through a target word sequence predicted based on a neural model trained by the method described above and an alignment information feature will be described with reference to the following example. The correction method will be described by taking the following sentence as an example.

[Source sentence: Korean] 상해에서는 마글레 프를 타면 됩니다.

The Korean sentence above means "In Shanghai, you can take Maglev." and is pronounced as [sang hae e so nun Maglev rul ta myon dwem ni da].

When an input is received, the input undergoes preprocessing in which a basic word separation and division into sub-words are performed in the same manner as when training data is processed. (See operation 100 described above.)

[Example basic word separation result] 상해/에서는/ 마글레프/를/타면 /됩/니다/.

[Example of sub-word division result] 상해/에서는/마+글+ 레프/를/타+면/됩/니+다/.

Then, input data is completed based on a word order sequence of the basic word separation result (see operation 300 described above).

[Example of completed input data]

상해^1_B 에서는^2_B 마^3_B+글^3_M+레프^3_E 를^4_B 타^5_B+면^5_E 됩^6_B 니^7_B/+다^7_E.^8_B

When translation is performed by a neural network learning model and the result is as shown below:
In^2_B/sang^1_B/+he^1_E/,^NONE_B/you^NONE_B/ can^6_B/take^5_B/mag^3_B/+hreb^3_E/.^NONE_B When a word of the source sentence is present in a dictionary defined by a user, for example, a user dictionary used to translate 상해 into Shanghai, a word ID of "상해" is searched for in the input source sentence. In the present example, a word ID of "상해" is number 1 and accordingly a target word connected to the number 1 word in the source sentence is searched for in the target side.

When the found sequence of sub-words is "sang" and "+he," the sub-words are combined into "sanghe." Thereafter, values in the dictionary defined by the user are referred to, and when a relevant value is present, "sanghe" is overwritten with "Shanghai". After this process, a translation result is obtained as shown below:

[Correction result by user dictionary] In/Shanghai/,/you/can/take/mag/+hreb/.

In order to find an unregistered word, the sub-word division results are combined and candidates to be corrected are searched for. Whether or not a word unused in the training data appears is determined by using the dictionary constructed with target words used in training data. When the word "maghreb" does not appear as a target word even once in the training data, a word connected to the ID of the pertinent word is found in the source sentence. Since the word connected to 3_B, 3_E is "maghreb," a target word of "마글레프" is searched for by using prepared Korean-English dictionary data.

If no target word exists, a translation result is returned as shown below.

[Output from combining translations of sub-words when there is no target word] In Shanghai, you can take maghreb.

Here, maghreb is an incorrect representation of Maglev, but is a similar representation, that is, a Romanized representation.

If "Maglev" is present in the target language, the translation result is corrected as shown below.

[Candidate detection by unregistered word-dictionary and output after correction by an external word dictionary] In Shanghai, you can take Maglev.

The translation result is corrected as shown above.

The present invention provides an automatic translation technology robust to unregistered words, and the following effects can be obtained.

1) Improvement of Translation Quality of NMT

Explicit word-alignment information is added without loss of sub-words in the learning step, so that the advantages of both basic sub-word-based NMT and word-alignment information-based correction function can be achieved.

Explicit word-alignment information assigned at the time of learning can allow for further transmitting feedback necessary for training an attention model (attention model: a model that indirectly learns the relationship between word tokens used as source sentence input in a neural network learning step and target word tokens appearing at the time of generating of a target-side output).

2) User-Defined Dictionary is Applicable to NMT

When a specific source word is to be replaced with another target word, predicted word-alignment information can allow for estimating an aligned position of a target word and replacing the target word with another target word.

It should be apparent to those skilled in the art that various modifications may be made to the above-described exemplary embodiments of the present invention without departing from the spirit or scope of the present invention. Thus, it is intended that the present invention covers all such modifications provided within the scope of the appended claims and their equivalents.

What is claimed is:

1. A neural machine translation method using a neural network which, when training data generated by a method of generating training data comprising (1) separating basic word boundaries in a sentence of a bilingual corpus used for learning; (2) extracting explicit word-alignment information from the sentence of the bilingual corpus used for learning; (3) dividing the word boundaries separated in step (1) into sub-word tokens; (4) generating new source language training data by using an output from the step (1) and an output from the step (3); and (5) generating new target language training data by using the explicit word-alignment information generated in the step (2) and the outputs from the steps (1) and (3) is input, is trained with the training data and generates a connection relationship between a source sentence input to the trained neural network and a target sentence output from the trained neural network the method comprising the steps of:

performing a 1:1 replacement of each of sub-word tokens constituting a source-side word sequence and a target-side word sequence in an output of a step selected from the steps (4) and (5) with a word embedding vector for neural network learning;

replacing explicit word-alignment information attached to the output of a step selected from the steps (4) and (5) with a feature embedding vector so that a feature that matches an order of each of the word sequences is added;

combining the replaced feature embedding vector with the word embedding vector for an input word at a corresponding position; and learning a combination of an immediately preceding word, a current word, and an immediately preceding feature, and generating an explicit word-alignment feature vector indicating a word immediately preceding a predicted word sequence, wherein the step of combining the replaced feature embedding vector with the word embedding vector is performed in a simple concatenation manner in which a sub-word indicating a sub-word token and alignment information associated with the sub-word, which are at the same point in a time series, are combined to form a long-length vector.

2. A neural machine translation apparatus using a neural network, comprising:

a training data processor configured to generate training data by using the method of generating training data comprising (1) separating basic word boundaries in a sentence of a bilingual corpus used for learning; (2) extracting explicit word-alignment information from the sentence of the bilingual corpus used for learning; (3) dividing the word boundaries separated in step (1) into sub-word tokens; (4) generating new source language training data by using an output from the step (1) and an output from the step (3); and (5) generating new target language training data by using the explicit word-alignment information generated in the step (2) and the outputs from the steps (1) and (3); and a model generator configured to train a neural network with the training data generated by the training data processor and generate an automatic translation model used to generate a connection relationship between a target sentence and a source sentence, wherein the model generator comprises:

a word embedding vector which replaces each of sub-word tokens constituting a source-side word sequence and a target-side word sequence in an output of a step selected from the steps (4) and (5) with a word embedding vector for neural network learning;

a feature embedding vector which replaces explicit word-alignment information with a word embedding vector so that a feature that matches an order of each of the word sequence is added;

a combining layer in which a replaced feature embedding vector is combined with a word embedding vector for an input word at a corresponding position; and a decoder which learns a combination of an immediately preceding word, a current word, and an immediately preceding feature, and generates an explicit word-alignment feature vector indicating a word immediately preceding a predicted word sequence, wherein in the combining layer in which the feature embedding vector is combined with the word embedding vector, the combination is performed in a concatenation manner in which a sub-word indicating a sub-word token and alignment information associated with the sub-word, which are the same point in a time series, are combined to form a long-length vector.

* * * * *